(12) United States Patent
Wen et al.

(10) Patent No.: US 11,042,997 B2
(45) Date of Patent: Jun. 22, 2021

(54) PANORAMIC PHOTOGRAPHING METHOD FOR UNMANNED AERIAL VEHICLE AND UNMANNED AERIAL VEHICLE USING THE SAME

(71) Applicant: Generalplus Technology Inc., Hsinchu (TW)

(72) Inventors: Shao-Min Wen, Hsin Chu (TW); Jing Jo Bei, Hsinchu (TW)

( * ) Notice: Subject to any disclaimer, the term of this patent is extended or adjusted under 35 U.S.C. 154(b) by 133 days.

(21) Appl. No.: 16/212,301

(22) Filed: Dec. 6, 2018

(65) Prior Publication Data

US 2020/0027222 A1    Jan. 23, 2020

(30) Foreign Application Priority Data

Dec. 6, 2017 (TW) .................................. 106142798

(51) Int. Cl.
*G06T 7/32* (2017.01)
*G06T 7/00* (2017.01)
*G06T 3/20* (2006.01)
*B64C 39/02* (2006.01)

(52) U.S. Cl.
CPC .............. *G06T 7/32* (2017.01); *B64C 39/024* (2013.01); *G06T 3/20* (2013.01); *G06T 7/97* (2017.01); *B64C 2201/127* (2013.01); *G06T 2207/20212* (2013.01)

(58) Field of Classification Search
CPC ... B64C 2201/127; G06T 3/4038; G06T 3/20; G06T 7/97
See application file for complete search history.

(56) References Cited

U.S. PATENT DOCUMENTS

| | | | | |
|---|---|---|---|---|
| 2011/0090337 A1* | 4/2011 | Klomp | ................. | G01C 11/025 348/144 |
| 2012/0050525 A1* | 3/2012 | Rinner | ..................... | G06T 7/33 348/117 |
| 2012/0200703 A1* | 8/2012 | Nadir | ..................... | H04N 5/232 348/144 |
| 2016/0198088 A1* | 7/2016 | Wang | ..................... | H04N 5/77 348/36 |
| 2017/0039765 A1* | 2/2017 | Zhou | ......................... | G06T 7/55 |
| 2017/0124745 A1* | 5/2017 | Christ | .................... | G01C 11/04 |
| 2020/0043195 A1* | 2/2020 | Ono | ......................... | G06T 7/73 |

FOREIGN PATENT DOCUMENTS

| | | | | |
|---|---|---|---|---|
| WO | WO-2015096806 A1 * | 7/2015 | ........... | G01S 5/0263 |
| WO | WO-2017113818 A1 * | 7/2017 | ......... | H04N 5/23238 |
| WO | WO-2019084719 A1 * | 5/2019 | ......... | H04N 5/23238 |

* cited by examiner

*Primary Examiner* — Mainul Hasan
(74) *Attorney, Agent, or Firm* — Muncy, Geissler, Olds & Lowe, P.C.

(57) ABSTRACT

A panoramic photographing method for an unmanned aerial vehicle (UAV) and an UAV using the same are provided. The panoramic photographing method includes steps of: disposing a digital camera on an UAV; recording a flying altitude and a flying angle of the UAV of each of photographed pictures when a panoramic photographing process is performed; performing an image stitching process, determining overlapped regions of the two photographed pictures, and obtaining a feature operation region by way of division according to the flying altitude and the flying angle of the UAV; and performing a feature operation in the overlapped regions of the two photographed pictures to determine an image stitching location, and thus generate a panoramic picture.

13 Claims, 9 Drawing Sheets

Center coordinates of the lens
$C_I\{X_{ic}, Y_{ic}, Z_{ic}\}$

PANORAMIC PHOTOGRAPHING METHOD FOR UNMANNED AERIAL VEHICLE AND UNMANNED AERIAL VEHICLE USING THE SAME

BACKGROUND OF THE INVENTION

Field of the Invention

The invention relates to the technology of an unmanned aerial vehicle (UAV), and more particularly to a panoramic photographing method for an UAV and the UAV using the same.

Description of the Related Art

An unmanned aerial vehicle (UAV) can provide services in many fields, such as land, surveying, forestry, transportation, water conservancy and military. A flight control device of the UAV mainly performs the flying altitude calculation of the UAV, the flying route control, the flying data feedback, and the associated flight tasks in the flying process. From the view of the structural division, the flight control system is the action center of the UAV, and the stability thereof decides the safety of the UAV in the overall flying process.

At present, the widest application of the UAV is photography. The UAV equipped with a digital camera can be used to perform aerial photography tasks. A smart mobile phone can be used to control the UAV to perform the fixed-location photography. China Patent No. CN104574278B discloses an aerial-photography image stitching method based on the local feedback mechanism and sparse global adjustment, wherein the UAV is used to perform the panoramic photography, and the images are transmitted to a terminal device through wireless streaming, and then the panoramic image stitching is performed in the terminal device.

China Patent Publication No. CN105611170A discloses an unmanned aerial vehicle and panoramic stitching method, device and system thereof, wherein the UAV is used to perform the panoramic photography, and the photographed pictures at the end of the UAV is panoramically stitched to obtain a panoramic image. In this patent, the pictures are stitched using a general scale-invariant feature transform (SIFT) operation or a speeded up robust feature (SURF) operation. China Patent Publication No. CN100517061C discloses a device for producing a panorama image and a method thereof, wherein the camera device is rotated by way of motor control to photograph and stitch the panoramic images.

In the existing patents, most panoramic images need to be positioned with the global positioning system (GPS) so that the relationship between the adjacent images can be obtained to facilitate the subsequent image stitching process. This method is only limited to the outdoor panoramic photography and the aerial view image photography, and cannot be applied to the indoor space. In the above-mentioned operation, the range of the comparing operation almost occupies 80% of the overall picture, so a lot of computation amounts need to be spent. If the processor of the digital camera equipped in the UAV is not powerful enough, then it is difficult to perform the panoramic photographing.

So, in most technology, such as CN104574278B, the photographed images are transmitted back to the terminal through the wireless transmission so that the image stitching is performed in the terminal. In CN105611170A, the image stitching is implemented in the UAV to avoid the wireless transmission and the drawback that the images need to be compressed so that the good quality can be obtained. However, this patent does not mention how to utilize the property of the UAV to reduce the calculation amount and the power consumption.

So, the reduction of the computation amount of the image stitching of the panoramic photographing is the problem needed to be urgently overcome.

BRIEF SUMMARY OF THE INVENTION

An objective of the invention is to provide a panoramic photographing method for an unmanned aerial vehicle (UAV) and the UAV using the same. Upon photographing, the altitude and angle of the UAV are recorded, and the block for the image stitching operation is determined according to the altitude and angle. Thus, the computation amount of image stitching of panoramic photographing is reduced, or the panoramic picture can be directly returned on the UAV without image stitching being performed on a control terminal.

In view of this, the invention provides a panoramic photographing method for an UAV. The panoramic photographing method for the UAV includes steps of: disposing a digital camera on the UAV; recording a flying altitude and a flying angle of the UAV of each of photographed pictures when a panoramic photographing process is performed; performing an image stitching process to determine overlapped regions of the two photographed pictures according to the flying altitude and the flying angle of the UAV, and obtain a feature operation region by way of division; and performing a feature operation in the feature operation region of the two photographed pictures to determine an image stitching location, and thus generate a panoramic picture.

The invention also provides an unmanned aerial vehicle (UAV) including a flying mechanism, a wireless transceiver, a digital camera, an inertia measurement unit and a control circuit. The inertia measurement unit detects a flying altitude and a flying angle, and outputs a feedback signal. The control circuit is coupled to the flying mechanism, the wireless transceiver, the digital camera and the inertia measurement unit. The control circuit controls the flying mechanism to control the flying altitude and the flying angle according to a signal received by the wireless transceiver, and determines the flying altitude and the flying angle according to the feedback signal of the inertia measurement unit. When the wireless transceiver receives a panoramic photographing instruction, the control circuit controls the digital camera to perform photographing, and records the flying altitude and the flying angle of the UAV of each of photographed pictures. When an image stitching process is performed, overlapped regions of the two photographed pictures are determined according to the flying altitude and the flying angle, and a feature operation region is obtained by way of division, and then a feature operation is performed in the feature operation region of the two photographed pictures to determine an image stitching location, and thus generate a panoramic picture.

In the panoramic photographing method for the UAV and the UAV using the same according to the preferred embodiment of the invention, the feature operation includes a scale-invariant feature transform (SIFT) operation. In another embodiment, the feature operation includes a speeded up robust features (SURF) operation. Furthermore, in the panoramic photographing method for the UAV in a preferred embodiment, the first photographed picture is further set as a center picture of the panoramic picture.

The essence of the invention is to record the flying altitude of the UAV and the flying angle of the UAV corresponding to each photographed picture when the image stitching of panoramic photographing of the UAV is performed. Furthermore, the overlapped portion of two pictures is determined in advance according to the flying altitude of the UAV and the flying angle of the UAV in the image stitching operation. So, when the feature operation, such as the scale-invariant feature transform (SIFT) operation or the speeded up robust feature (SURF) operation, is performed, the feature operation is needed in only the overlapped regions of the two photographed pictures rather than the entire photographed picture. Thus, the panoramic photographing of the UAV can be performed with the less computation amount and the lower operation power. Furthermore, this panoramic photographing does not need the GPS, and this method can perform the photographing either indoors or outdoors.

The above-mentioned and other objects, features and advantages of the present invention will become more apparent from the following detailed descriptions of preferred embodiments thereof taken in conjunction with the accompanying drawings.

DETAILED DESCRIPTION OF THE INVENTION

Figure 1A:
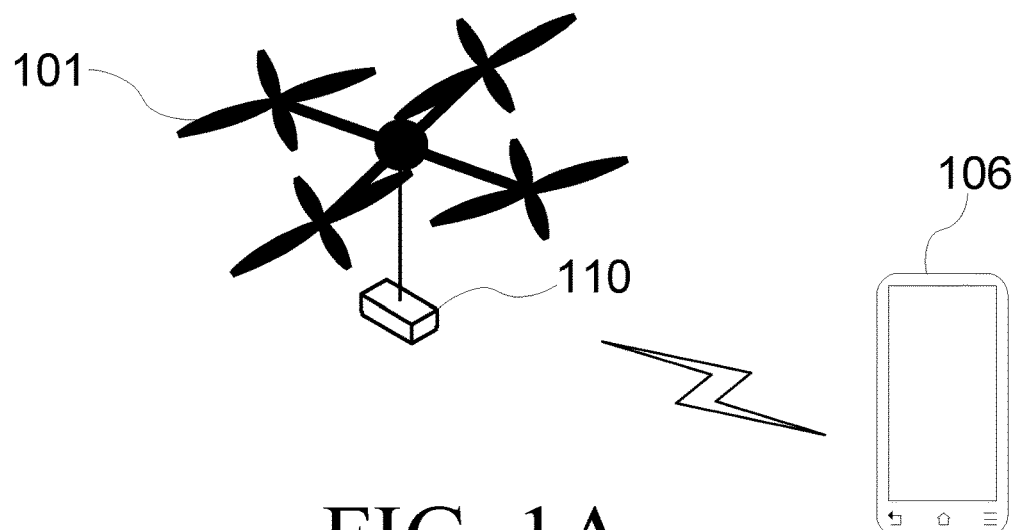
FIG. 1A is a schematic view showing an unmanned aerial vehicle (UAV) according to a preferred embodiment of the invention.
Figure 1B:
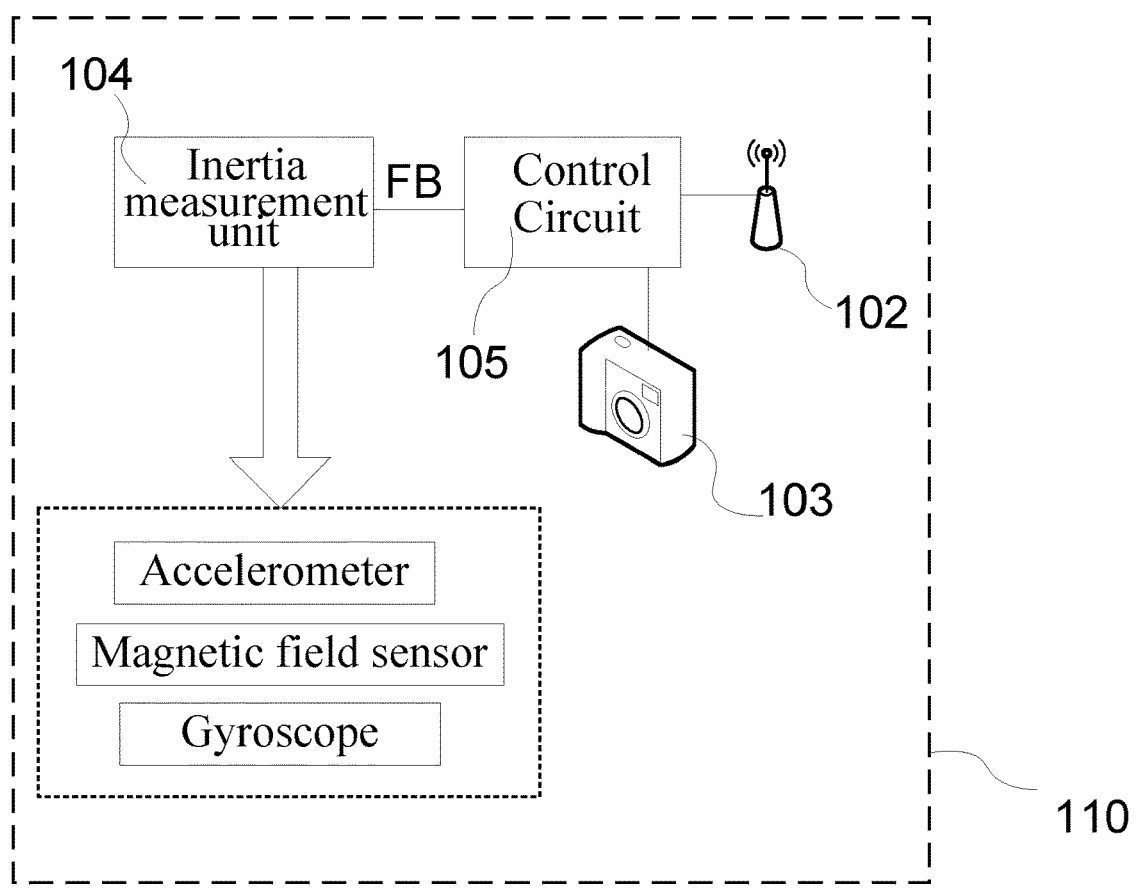
FIG. 1B is a schematic view showing a circuit module 110 of the UAV according to a preferred embodiment of the invention.

FIG. 1A is a schematic view showing an unmanned aerial vehicle (UAV) according to a preferred embodiment of the invention. Referring to FIG. 1A, the UAV includes a flying mechanism 101 and a circuit module 110. FIG. 1B is a schematic view showing a circuit module 110 of the UAV according to a preferred embodiment of the invention. Referring to FIG. 1B, the circuit module 110 includes a wireless transceiver 102, a digital camera 103, an inertia measurement unit 104 and a control circuit 105. In this embodiment, the UAV is, for example, a quadrotor UAV that is currently used more frequently. Because the UAV of this disclosure is mainly used for photographing, a model that can be used for fixed-point flights is selected. The inertia measurement unit 104 is used for detecting a flying altitude and a flying angle of the quadrotor UAV and outputting a feedback signal FB. Generally speaking, the inertia measurement unit 104 has a stable body function, and a nine-axis sensor is generally selected. The nine-axis sensor is generally constituted by a triaxial magnetic field sensor, a triaxial acceleration sensor and a triaxial gyroscope.

The wireless transceiver 102 in this embodiment is used for receiving a control instruction of a mobile device 106, and returning data to the mobile device 106. Although the mobile device is taken as an example in this embodiment, those skilled in the art should know that a remote controller can also be used for implementation. Therefore. the invention is not restricted thereto. The control circuit 105 is coupled to the flying mechanism 101, the wireless transceiver 102, the digital camera 103 and the inertia measurement unit 104. The control circuit 105 controls the flying mechanism 101 to control the flying altitude and the flying angle according to a signal received by the wireless transceiver 102, and determines the flying altitude and the flying angle according to the feedback signal FB of the inertia measurement unit 104.

Figure 2:
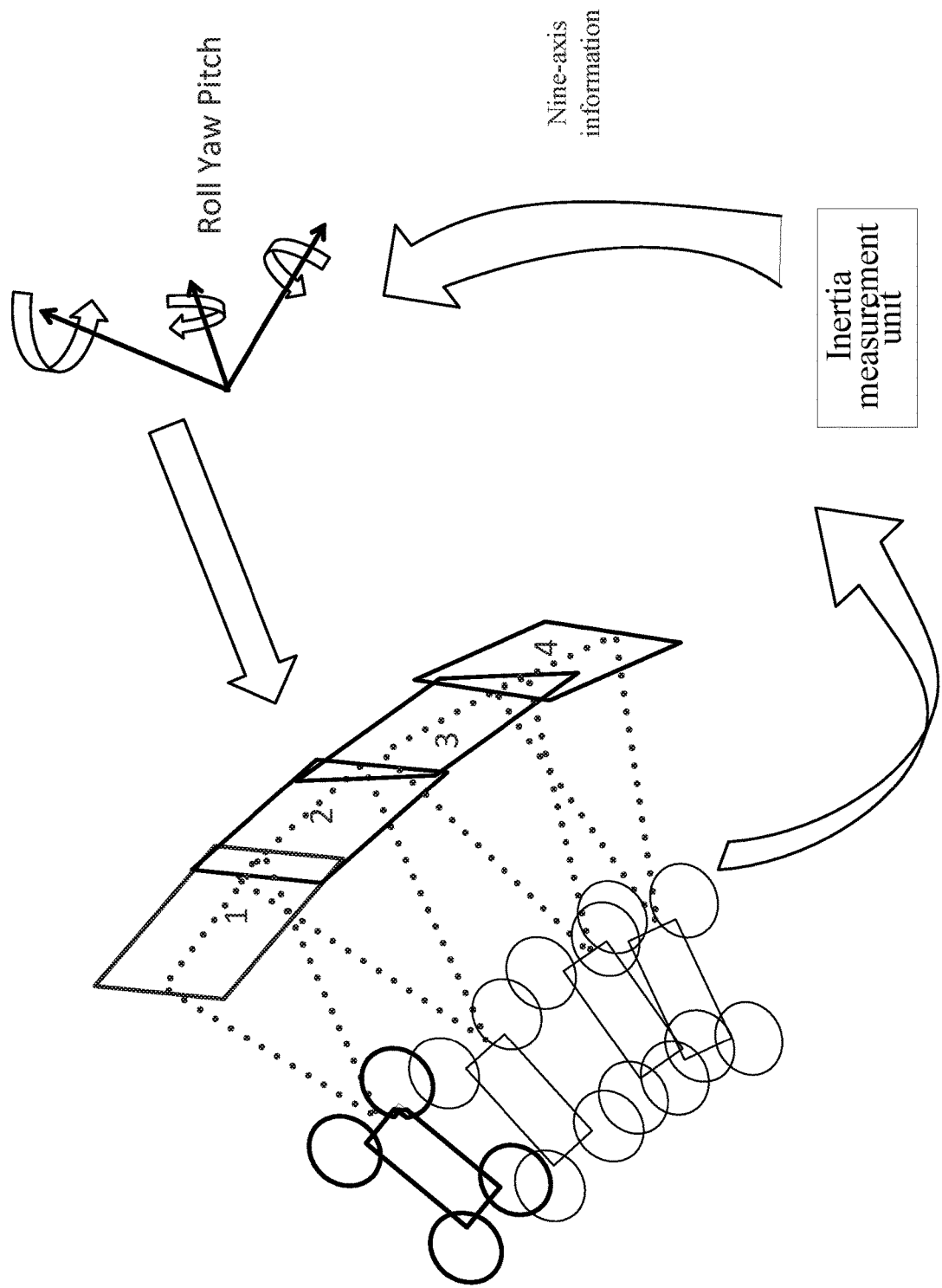
FIG. 2 is a schematic view showing panoramic photographing of the UAV according to a preferred embodiment of the invention.

FIG. 2 is a schematic view showing panoramic photographing of the UAV according to a preferred embodiment of the invention. Referring to FIG. 2, when the mobile device 106 outputs a control instruction for panoramic photographing, the UAV will start photographing in order. Taking FIG. 2 as an example, after the first picture has been photographed, the UAV rotates an angle to photograph the second picture. Similarly, the third and fourth pictures are photographed. In this embodiment, the panoramic photographing process takes four pictures, for example, but the invention is not limited to the number of pictures. In this embodiment, a picture is photographed at each time, the control circuit 105 records the flying altitude and the flying angle returned by the inertia measurement unit 104 when the picture is photographed. In addition, when an image stitching process is performed, the control circuit 105 firstly determines overlapped regions of the two photographed pictures photographed continuously according to the flying altitude and the flying angle of each photographed picture to decide a feature operation region obtained by way of division. Thereafter, a feature operation is performed in the feature operation region of the two continuously photographed pictures to determine an image stitching location, and thus to generate a panoramic picture. unit 105 firstly determines overlapped regions of the two photographed pictures photographed continuously according to the flying altitude and the flying angle of each photographed picture to decide a feature operation region obtained by way of division. Thereafter, a feature operation is performed in the feature operation region of the two continuously photographed pictures to determine an image stitching location, and thus to generate a panoramic picture.

Figure 3A:
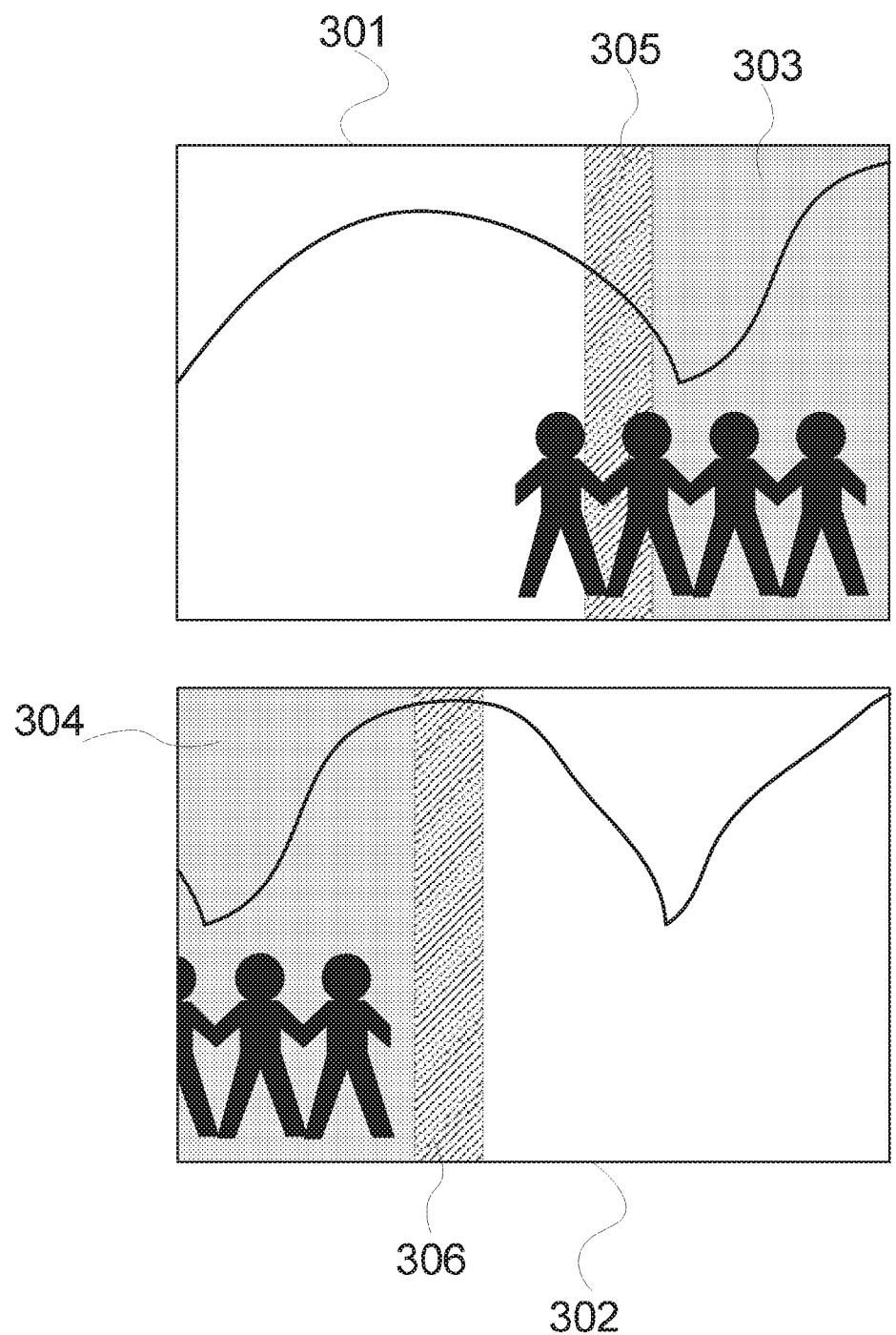
FIGS. 3A and 3B are schematic views showing an image stitching process according to a preferred embodiment of the invention.
Figure 3B:
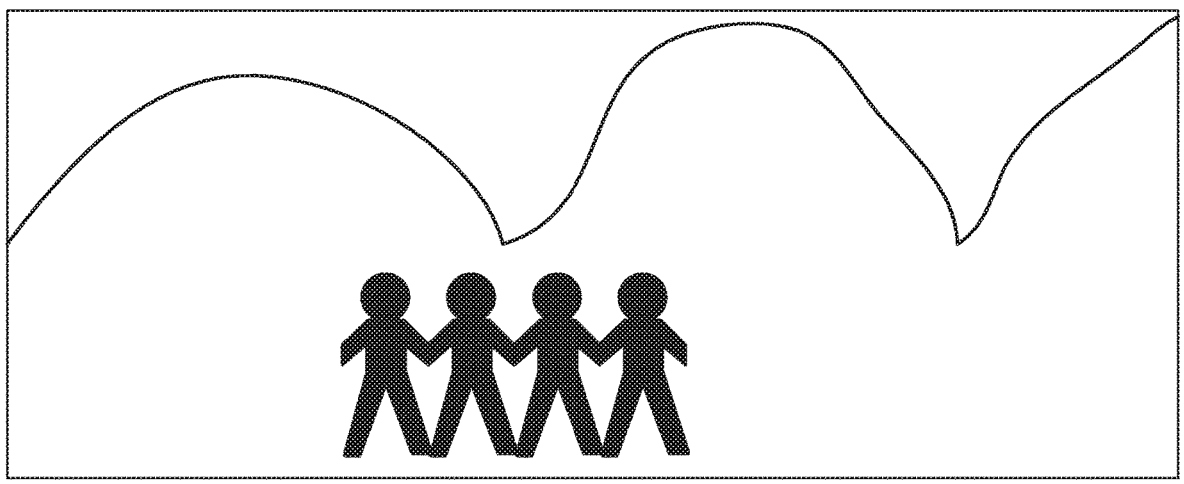

FIGS. 3A and 3B are schematic views showing an image stitching process according to a preferred embodiment of the invention. Referring first to FIG. 3A and taking the above-mentioned two continuously photographed pictures as an example, symbol 301 denotes the first picture photographed by the digital camera 103 of the UAV, and symbol 302 denotes the second picture photographed by the digital camera 103 of the UAV after being rotated by an angle. In FIG. 3, the regions indicated by symbols 303 and 304 are gray scale regions respectively representing the overlapped regions of the first picture and the second picture actually photographed. In addition, the regions indicated by symbols 305 and 306 are hatched regions respectively representing predetermined ranges extended from the overlapping photographed regions of the two photographed pictures.

In the above-mentioned image stitching process, the control circuit 105 determines the overlapped regions 303 and 304 of the two photographed pictures according to the flying angle and the flying altitude recorded when the picture 301 and the picture 302 are photographed, and then predetermined ranges 305 and 306 are extended outwardly from the overlapped regions 303 and 304. The overlapped region 303 plus the predetermined range 305 is the feature operation region of the picture 301. The overlapped region 304 plus the predetermined range 306 is the feature operation region of the picture 302. Thereafter, the control circuit 105 performs feature point search and feature point comparison to perform stitching of the two photographed pictures, as shown in FIG. 3B.

Compared with the image stitching process in the prior art, it is necessary to search for feature points of two photographed pictures firstly, and then compare the feature points of the two photographed pictures. However, in the prior art, when the feature points are compared, it is necessary to search for feature points of the entire photographed pictures and compare the feature points of the entire photographed pictures. Compared with the invention, the flying angle and the flying altitude of the UAV corresponding to the photographed picture are recorded firstly to obtain the overlapped regions of the two photographed pictures, so the invention can extremely narrow down the region for feature point search and comparison. That is, the invention can significantly reduce the computation amount required for the image stitching.

As can be understood from the above-mentioned description, the computation amount required for the image stitching can be significantly reduced in the invention. Therefore, the image stitching process of the invention can be directly operated in the UAV, the panoramic picture is obtained, and then the panoramic picture is outputted to the mobile device 106 through the wireless transceiver 102. In addition, when panoramic photographing is performed, the UAV returns each photographed picture and the flying altitude and the flying angle corresponding to each photographed picture to the mobile device 106, so that the above-mentioned image stitching process can also be performed in the mobile device 106. In another embodiment of the invention, when panoramic photographing is performed, the UAV can firstly determine the overlapped regions according to the flying altitude and the flying angle corresponding to each photographed picture, and then return each photographed picture and the positions of the overlapped regions of the photographed pictures to the mobile device 106, so that the mobile device 106 performs the above-mentioned image stitching process.

In the example of FIG. 3, the UAV is rotated or moved only in the horizontal direction after the first picture is photographed. However, those skilled in the art should know that when the UAV is rotated or moved, there may be multiple directions and angles in the distance of rotation or movement due to the limitation of the mechanism of the UAV. Therefore, the control circuit 105 in the invention obtains the overlapped regions according to the feedback signal FB returned by the inertia measurement unit 104, decides the feature operation region, performs the feature point search and comparison, and finishes the image stitching accordingly.

In the above-mentioned panoramic photographing process, every time when a picture is photographed, the UAV rotates an angle, and a next picture is photographed again to perform the image stitching process. The magnitude of this angle of rotation is determined according to, for example, the magnitude of the lens angle of the digital camera 103 and the hardware limitation of the flying mechanism 101 and the like. For example, if the parameter of the field of view (FOV) of the lens of the digital camera 103 is larger, then it means that the lens has a larger photographing angle. Therefore, the UAV can have a larger angle of rotation every time when it photographs. In order to make the continuously photographed pictures have the overlapped regions, the angle of each rotation of the UAV must be smaller than the FOV parameters. In addition, the angle of rotation may be, for example, a fixed predetermined angle, and the predetermined angle may be preset by the system designer, may be set by the user through the mobile device 106, or may also be determined by the control circuit based on the actual state of the UAV.

In the above-mentioned panoramic photographing process, every time when a picture is photographed, the control circuit 105 records the feedback signal FB returned by the inertia measurement unit 104, and the control circuit 105 determines the overlapped region of every picture through the feedback signal to perform the subsequent image stitching process. Generally speaking, a nine-axis or six-axis sensor is selected as the inertia measurement unit 104. Therefore, the inertia measurement unit 104 is able to return the nine-axis information or six-axis information to the control circuit 105. However, in the invention embodiment, when the control circuit 105 actually records and calculates the overlapped regions, only some information in the nine-axis information or six-axis information may be used. For example, the overlapped regions can be calculated using only the triaxial information. Therefore, the invention is not limited to the amount of information recorded and calculated.

Figure 4:
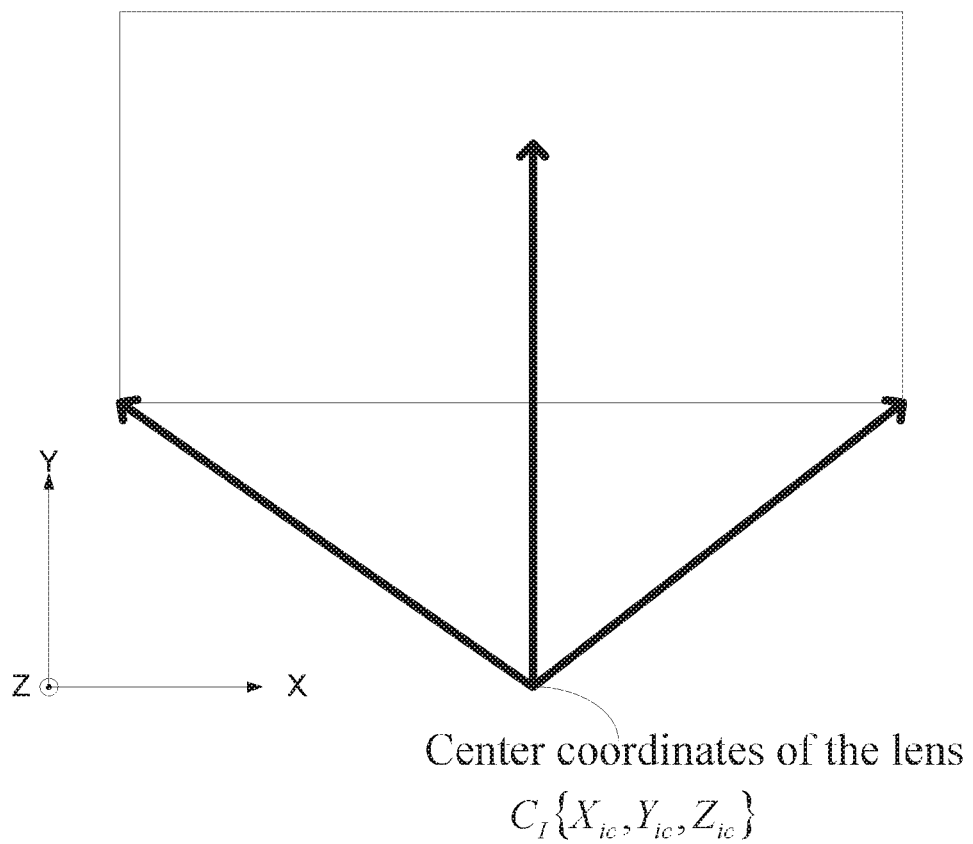
FIG. 4 is a schematic view showing the relationship between the center of the lens and the photographed picture at the time point T1 in a preferred embodiment of the invention.

In order to make those skilled in the art implement the invention according to the this embodiment, how to determine the overlapped regions of the two photographed pictures according to the flight information of the UAV in the image stitching process will be explained in the following. First, a picture is photographed at a time point T1, a photographed picture (represented as I) is generated, and the camera's coordinates at this time are $W_I$. Here, for the sake of illustration for this embodiment, the camera's initial position coordinates are set to $W_I(0,0,0)$. FIG. 4 is a schematic view showing the relationship between the center of the lens and the photographed picture at the time point T1 in a preferred embodiment of the invention. At this time, the center of the lens is represented as $C_I \{X_{ic}, Y_{ic}, Z_{ic}\}$.

Figure 5:
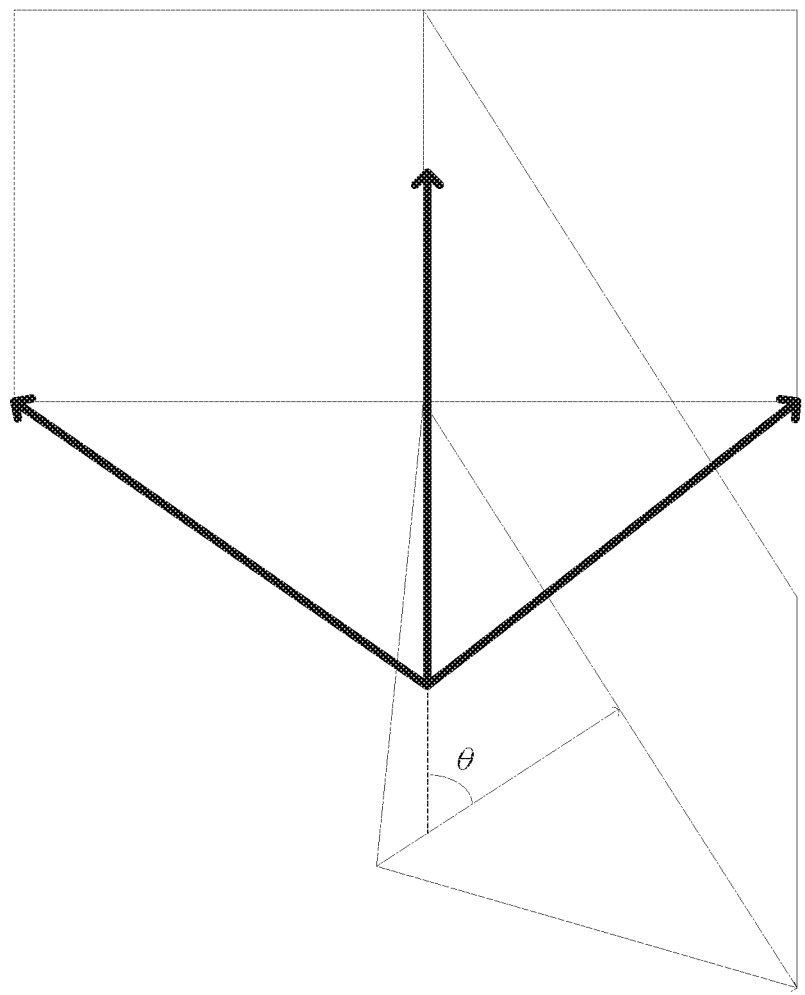
FIG. 5 is a schematic view showing the relationship between the center of the lens and the photographed picture at the stereoscopic viewing angle in a preferred embodiment of the invention.
Figure 6:
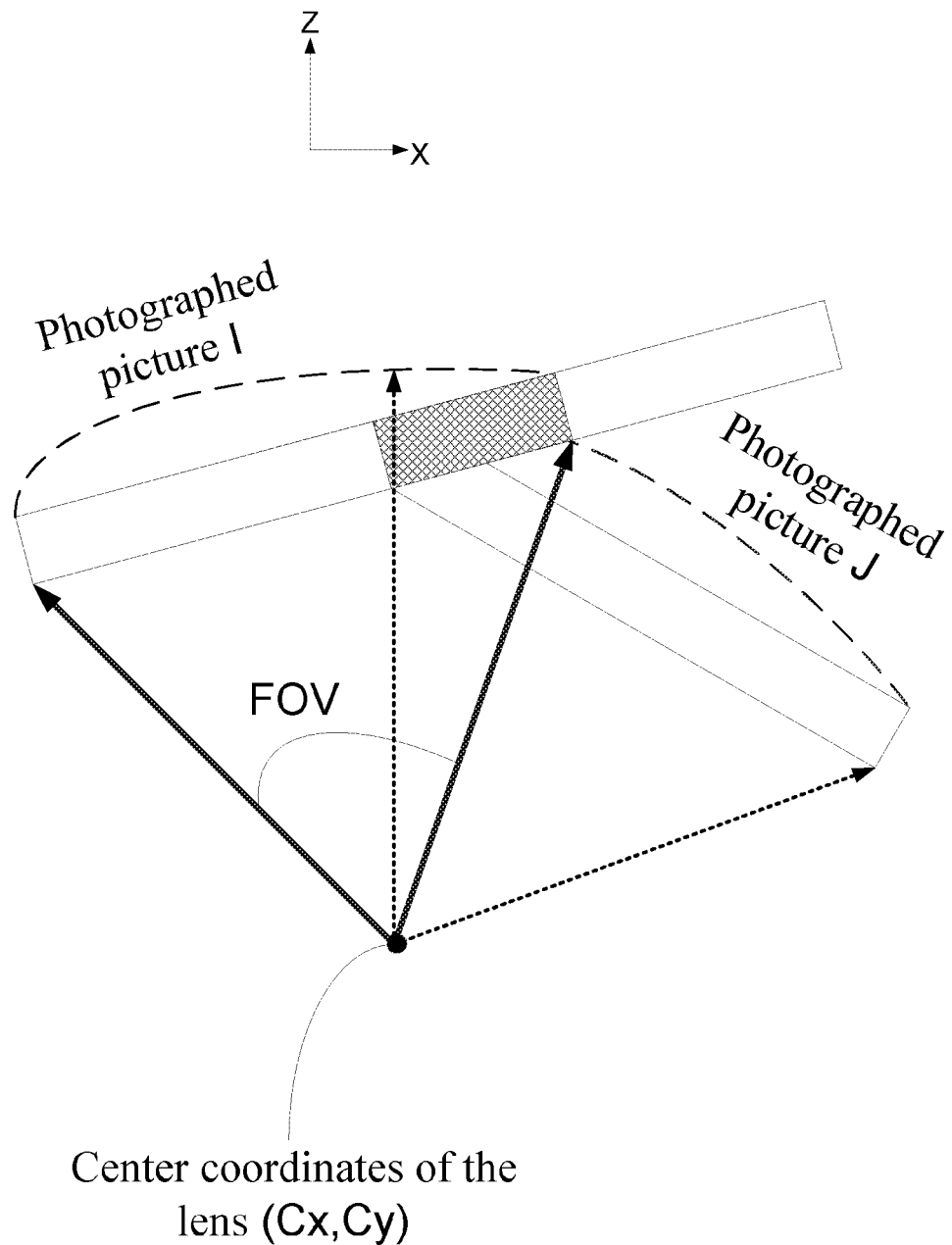
FIG. 6 is a schematic view showing the relationship between the center of the lens and the photographed picture at the aerial viewing angle in a preferred embodiment of the invention.

At the time point T1, the control circuit will start recording the triaxial acceleration $A(x,y,z)$ returned by the inertia measurement unit 104. Next, it is assumed that the camera is only rotated in a manner perpendicular to the Z axis. Furthermore, when the camera is rotated by an angle θ, the next photographing is performed (i.e., at the time point T2), and a photographed picture (represented as J) is generated, as shown in FIG. 5. FIG. 5 is a schematic view showing the relationship between the center of the lens and the photographed picture at the stereoscopic viewing angle in a preferred embodiment of the invention. FIG. 6 is a schematic view showing the relationship between the center of the lens and the photographed picture at the aerial viewing angle in a preferred embodiment of the invention.

FIG. 6 is shown at the aerial viewing angle. That is, FIG. 6 is perpendicular to the Y axis. Since it is assumed that the camera is only rotated in a manner perpendicular to the Z axis in this embodiment, the center of the lens at the time point T1 is simply represented as $C_I=(c_x, c_y)$. In addition, since the lens in the UAV is calibrated, the focal length of the lens is known. When photographing is performed at the time point T1, the control circuit can calculate the rotation matrix, which is represented as $R_I$, at this time according to the sensor fusion algorithm and the nine-axis information returned by the inertia measurement unit 104 upon photographing. Similarly, when photographing is performed at the next time point T2, the control circuit can calculate the rotation matrix, which is represented as $R_j$, at this time according to the sensor fusion algorithm and the nine-axis information returned by the inertia measurement unit 104 upon photographing.

In addition, the control circuit records the triaxial acceleration A(x,y,z) returned by the inertia measurement unit 104 between the time points T1 and T2, so the relative displacement amount of the camera between the time points T1 and T2 is obtained through speed integration in the time domain. In other words, the control circuit can obtain the camera's coordinates $W_j$ (X,Y, Z) at the time point T2 through the speed integration and the triaxial acceleration recorded data. The camera's coordinates $W_I$ and $W_j$ are convertible to the center coordinates $C_I$ and $C_j$ of the lens, so that the displacement matrix may be obtained. In this embodiment, if the center of the lens at the time point T1 is set as 0, then the center of the lens at the time point T2 is offset to $(c_{jx}, c_{jy})$. According to the above-mentioned known or calculated numerical data (rotation matrix $R_I$, rotation matrix $R_j$, displacement matrix $T_j$ and focal length f), it is possible to estimate a homograph matrix, which has the mathematical equation expressed as H, and the value expressed by the following mathematical equation (1).

$$H = \begin{bmatrix} h_{11} & h_{12} & h_{13} \\ h_{21} & h_{22} & h_{23} \\ h_{31} & h_{32} & h_{33} \end{bmatrix} \approx V_I R_I R_J^{-1} (T_J V_J)^{-1}, \quad (1)$$

$$V_I = \begin{bmatrix} f_I & 0 & 0 \\ 0 & f_I & 0 \\ 0 & 0 & f_I \end{bmatrix}$$

$$V_J = \begin{bmatrix} f_J & 0 & 0 \\ 0 & f_J & 0 \\ 0 & 0 & f_J \end{bmatrix}$$

The digital camera photographs the photographed picture I at the time point T1 through a first focal length $f_I$, and the control circuit calculates a first focal length matrix $V_I$ according to the first focal length $f_I$. The digital camera photographs the photographed picture J at the time point T2 through a second focal length $f_j$, and the control circuit calculates a second focal length matrix $V_j$ according to the second focal length $f_j$.

According to the mathematical equation (1), the control circuit can estimate the homograph matrix, the photographed picture I and the photographed picture J can be projected onto the same plane by way of coordinate transformation. In this embodiment, if the photographed picture I is used as the reference plane, then the image obtained by projecting the photographed picture J onto the reference plane is represented as J', and the relationship of coordinate transformation is represented by the following mathematical equations (2) and (3). In FIG. 6, the overlapping region of the image J', obtained after the photographed picture J is projected, and the photographed picture I is indicated by the hatched region.

$$x' = \frac{h_{11}x + h_{12}y + h_{13}}{h_{31}x + h_{32}y + h_{33}}$$

$$y' = \frac{h_{21}x + h_{22}y + h_{23}}{h_{31}x + h_{32}y + h_{33}}$$

Substituting the coordinate values of four points of the boundary of the photographed picture J into the mathematical equations (2) and (3) can obtain the projected image J'. In the above equations (2) and (3), x and y are coordinate values in the photographed picture I, respectively, x' and y' are coordinate values in the projected image J'. Therefore, the overlapping region in the photographed picture I can be obtained according to the above-mentioned equations (2) and (3).

As can be seen from the above-mentioned description, at least the following five steps may be summarized in the image stitching process of the embodiment of the invention.

In the first step, the control circuit records the flying altitude and the flying angle of the UAV at the first time T1, and further calculates the first rotation matrix $R_I$ according to the sensor fusion algorithm and the flying altitude and the flying angle recorded at the first time. Furthermore, the control circuit records the flying altitude and the flying angle of the UAV at the second time T2, and further calculates the second rotation matrix $R_j$ according to the sensor fusion algorithm and the flying altitude and the flying angle recorded at the second time.

In the second step, a camera's focal length matrix, including the above-mentioned $V_I$ and $V_j$, is obtained according to a focal length of the digital camera.

In the third step, the control circuit detects the displacement of the center of the lens of the digital camera to obtain a camera displacement matrix. Those skilled in the art should know that the order of priority of the first to third steps described hereinabove are not particularly restricted.

In the fourth step, the control circuit calculates a homograph matrix according to the camera's focal length matrix, the camera displacement matrix, the first rotation matrix and the second rotation matrix.

In the five step, the image coordinates of the second photographed picture J is substituted to obtain the image coordinates corresponding to the first photographed picture I according to the homograph matrix (e.g., the above-mentioned equations (2) and (3)).

Figure 7:
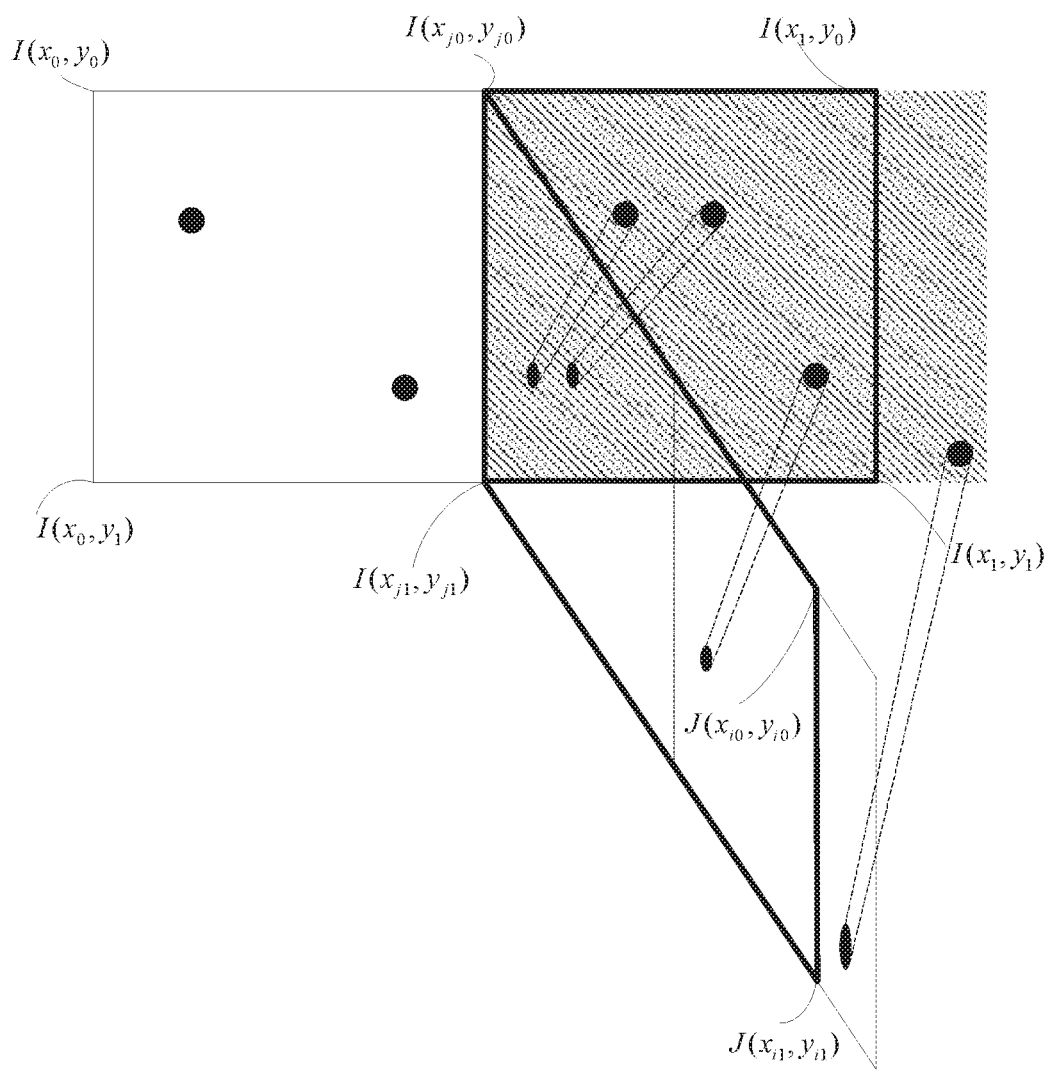
FIG. 7 is a schematic view showing image projections of a photographed picture I, a photographed picture J and a photographed picture J' in a preferred embodiment of the invention.

In the following, how to use the homography matrix to obtain the overlapped regions will be described. FIG. 7 is a schematic view showing image projections of the photographed picture I, the photographed picture J and the photographed picture J' in a preferred embodiment of the invention. The overlapped region is indicated by a hatched region. The range of the overlapped region within the photographed picture I is indicated by bold lines, and the range of the overlapped region within the photographed picture J is similarly indicated by bold lines.

Referring to FIG. 7, after projecting the photographed picture J onto the photographed picture I, the coordinates of the four vertices of the overlapped region in the image I are/$(x_{jo}, y_{j0})$、$I(x_1, y_0)$、$I(x_{j1}, y_{j1})$ and $I(x_1, y_1)$, where $I(x_{jo}, y_{j0})$ and $I(x_{j1}, y_{j1})$ may be obtained through the above-mentioned equations (2) and (3). Therefore, ranges of the length and width of the overlapped region are as follows:

$$W_I = x_1 - x_{j0} \text{ if } (x_1 - x_{j0} \geq x_1 - x_{j1}) \text{ or}$$

$$W_I = x_1 - x_{j1} \text{ if } (x_1 - x_{j0} < x_1 - x_{j1})$$

$$H_I = y_{j1} - y_{j0} \text{ if } (y_{j1} - y_{j0} \geq y_1 - y_0) \text{ or}$$

$$H_I = y_1 - y_0 \text{ if } (y_1 - y_0 < y_{j1} - y_{j0})$$

Referring to FIG. 7, after projecting the photographed picture J onto the photographed picture I, the coordinates of the four vertices of the overlapped region in the image J are $J(x_o, y_0)$、$J(x_1, y_0)$、$J(x_{i0}, y_{i0})$ and $J(x_{i1}, y_{i1})$, where $J(x_{i0}, y_{i0})$ and $J(x_{i1}, y_{i1})$ may be obtained through the above-mentioned equations (2) and (3). Therefore, ranges of the length and width of the overlapped region are as follows:

$$W_J = x_{i0} - x_0 \text{ if } (x_{i0} - x_0 \geq x_{i1} - x_0) \text{ or}$$

$$W_J = x_{i1} - x_0 \text{ if } (x_{i1} - x_0 < x_{i0} - x_0)$$

$$H_I = y_1 - y_0 \text{ if } (y_1 - y_0 \geq y_{i1} - y_{i0}) \text{ or}$$

$$H_I = y_{i1} - y_{i0} \text{ if } (y_{i1} - y_{i0} < y_1 - y_0)$$

In addition, for the sake of illustration of the invention, it is assumed that there are five feature points in the photographed picture I, and there are four feature points in the image of the photographed picture J. After the division of the overlapped region, there are 3 feature points of the image I falling into the overlapped region, and 3 feature points of the image J falling into the overlapped region. Therefore, the feature comparison only needs to compare the feature points falling into the region so as to save other comparisons and calculation time.

Figure 8:
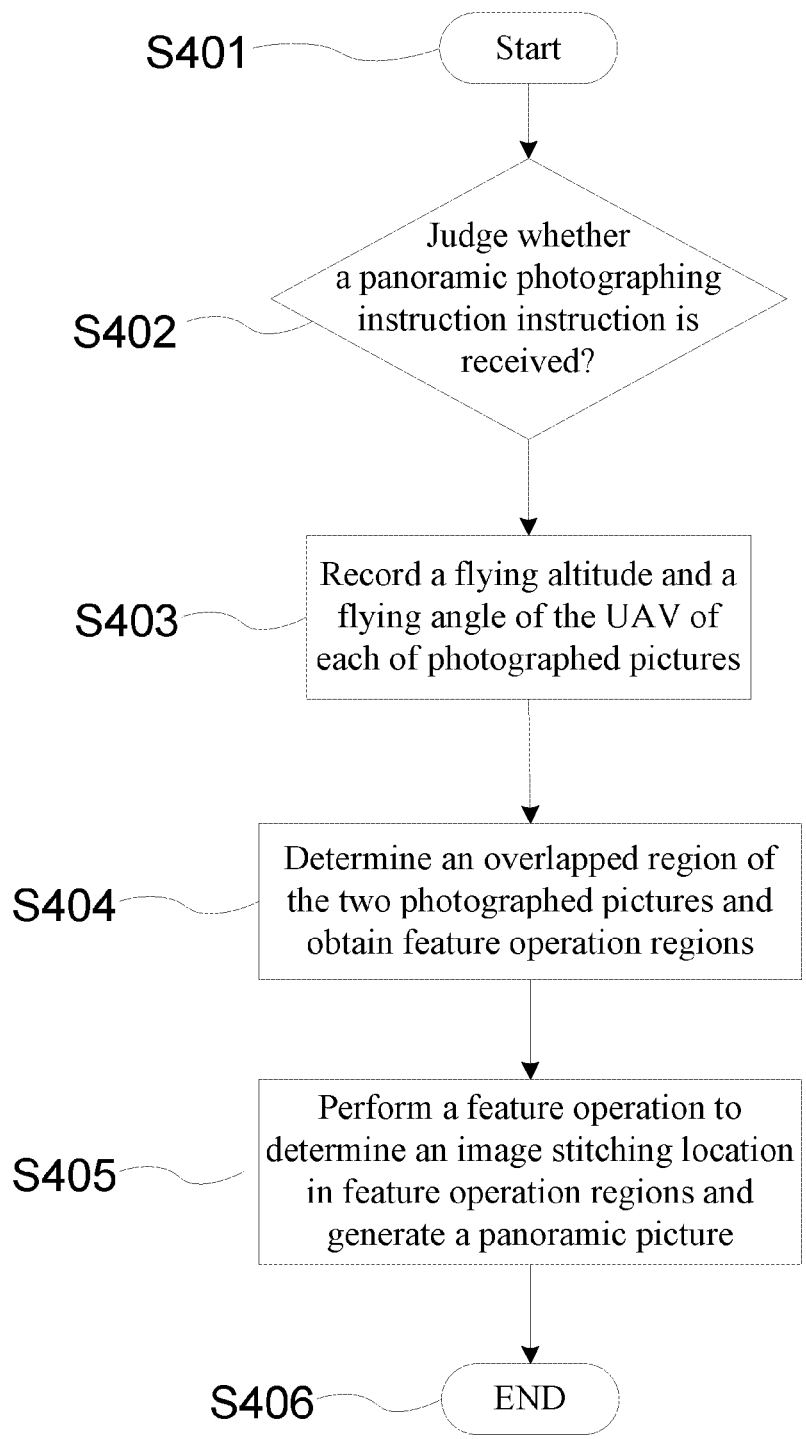
FIG. 8 is a flow chart showing a panoramic photographing method for the UAV according to a preferred embodiment of the invention.

FIG. 8 is a flow chart showing a panoramic photographing method for the UAV according to a preferred embodiment of the invention. Referring to FIGS. 1A, 1B and 8, the method includes the following steps.

In a step S401, the method starts.

In a step S402, it is judged whether a panoramic photographing instruction is received. When the panoramic photographing instruction is received, a step S403 is performed.

In the step S403, panoramic photographing is performed to record a flying altitude and a flying angle of the UAV of each of photographed pictures. When the wireless transceiver 102 receives a panoramic photographing instruction, the panoramic photographing instruction is sent to the control circuit 105. At this time, the control circuit 105 controls the digital camera 103 to perform the photographing. Furthermore, when a picture is photographed at each time, the control circuit 105 captures the flying attitude and flying angle of the UAV from the inertia measurement unit 104 at this time, and immediately records the flying altitude and the flying angle of the UAV when the picture is photographed.

In a step S404, an image stitching process is performed to determine overlapped regions of the two photographed pictures, and obtain a feature operation region by way of division according to the flying altitude and the flying angle of the UAV. The feature operation region is the example of FIG. 3 described hereinabove, and detailed descriptions thereof will be omitted.

In a step S405, a feature operation is performed to determine an image stitching location in feature operation regions of the two adjacent photographed pictures, and thus to generate a panoramic picture, as shown in FIG. 4. The feature operation in the embodiment of the invention includes the feature point search in the feature operation regions and the feature point comparison of two photographed pictures in the feature operation regions. The feature point search is performed through, for example, the scale-invariant feature transform (SIFT) operation or the speeded up robust features (SURF) operation and other image calculation techniques. In addition, the feature point comparison is, for example, the random sample consensus (RANSAC) and other image comparison techniques. However, the feature operation of the invention is not limited to the above-mentioned examples, any feature operation can be applied to the invention as long as it is the technique for feature point search and comparison in video technology.

In step S406, the method ends.

In addition, a step can also be inserted between the steps S405 and S406. The first photographed picture is set as a central picture to center the image of the first viewing angle of the first picture to facilitate the picture preview for the user.

In summary, the essence of the invention is to record the flying altitude of the UAV and the flying angle of the UAV corresponding to each photographed picture when the image stitching of panoramic photographing of the UAV is performed. Furthermore, the overlapped portion of two pictures is determined in advance according to the flying altitude of the UAV and the flying angle of the UAV in the image stitching operation. So, when the feature operation is performed, the feature operation is needed in only the overlapped regions of the two photographed pictures rather than the entire photographed picture. Thus, the panoramic photographing of the UAV can be performed with the less computation amount and the lower operation power. Furthermore, this panoramic photographing does not need the GPS, and this method can perform the photographing either indoors or outdoors.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. An unmanned aerial vehicle (UAV), comprising:
   a flying mechanism;
   a wireless transceiver;
   a digital camera;
   an inertia measurement unit for detecting a flying altitude and a flying angle, and outputting a feedback signal; and
   a control circuit coupled to the flying mechanism, the wireless transceiver, the digital camera and the inertia measurement unit, wherein the control circuit controls the flying mechanism to control the flying altitude and the flying angle according to a signal received by the wireless transceiver, and determines the flying altitude and the flying angle according to the feedback signal of the inertia measurement unit, wherein:

when the wireless transceiver receives a panoramic photographing instruction, the control circuit controls the digital camera to perform photographing, and records the flying altitude and the flying angle of the UAV of each of photographed pictures; and when an image stitching process is performed, overlapped regions of the two photographed pictures photographed in order is determined according to the flying altitude and the flying angle, and a feature operation region is obtained by way of division, and then a feature operation is performed in the feature operation region of the two photographed pictures to determine an image stitching location, and thus generate a panoramic picture, wherein the digital camera performs picture photographing at a first time to obtain a first photographed picture, and the digital camera performs picture photographing at a second time to obtain a second photographed picture, wherein the image stitching process comprises:

obtaining a camera's focal length matrix according to focal lengths of the digital camera:

recording, by the control circuit, the flying altitude and the flying angle of the UAV at the first time, and then further calculating, by the control circuit, a first rotation matrix according to a sensor fusion algorithm and the flying altitude and the flying angle recorded at the first time;

recording, by the control circuit, the flying altitude and the flying angle of the UAV at the second time, and then further calculating, by the control circuit, a second rotation matrix according to the sensor fusion algorithm and the flying altitude and the flying angle recorded at the second time;

detecting a displacement of a center of a lens of the digital camera and obtaining a camera displacement matrix;

calculating, by the control circuit, a homograph matrix according to the camera's focal length matrix, the camera displacement matrix, the first rotation matrix and the second rotation matrix; and substituting image coordinates of the second photographed picture according to the homograph matrix to obtain corresponding image coordinates in the first photographed picture.

2. The UAV according to claim 1, wherein the inertia measurement unit is a nine-axis sensor comprising:
a triaxial magnetic field sensor;
a triaxial acceleration sensor; and
a triaxial gyroscope.

3. The UAV according to claim 1, wherein the feature operation comprises:
a scale-invariant feature transform (SIFT) operation.

4. The UAV according to claim 1, wherein the feature operation comprises:
a speeded up robust features (SURF) operation.

5. The UAV according to claim 1, wherein the camera's focal length matrix comprises a first focal length matrix and a second focal length matrix, the digital camera photographs the first photographed picture through a first focal length, the control circuit calculates the first focal length matrix according to the first focal length, and the digital camera photographs the second photographed picture through a second focal length, and the control circuit calculates the second focal length matrix according to the second focal length, where the first focal length is represented as $f_I$, the second focal length is represented as $f_J$, and the first focal length matrix is represented as $V_I$ having a mathematical equation of $$V_I = \begin{bmatrix} f_I & 0 & 0 \\ 0 & f_I & 0 \\ 0 & 0 & f_I \end{bmatrix}$$

where the second focal length matrix is represented as $V_J$ having a mathematical equation of $$V_J = \begin{bmatrix} f_J & 0 & 0 \\ 0 & f_J & 0 \\ 0 & 0 & f_J \end{bmatrix}.$$

6. The UAV according to claim 5, wherein the camera displacement matrix is represented as $T_J$ having a mathematical equation of $$T_J = \begin{bmatrix} 1 & 0 & c_{jx} \\ 0 & 1 & c_{jy} \\ 0 & 0 & 1 \end{bmatrix}$$

where $C_{jx}$ represents a displacement amount of the center of the lens of the digital camera in an X-axis direction from the first time to the second time, $C_{jy}$ represents a displacement amount of the center of the lens of the digital camera in a Y-axis direction from the first time to the second time, the first rotation matrix is represented as $R_I$, the second rotation matrix is represented as $R_J$, and the homograph matrix is represented as H having a mathematical equation, which is represented as $H \approx V_I R_I R_J^{-1} (T_J V_J)^{-1}$.

7. A panoramic photographing method for an unmanned aerial vehicle (UAV), the panoramic photographing method comprising:
disposing a digital camera on the UAV;
recording a flying altitude and a flying angle of the UAV of each of photographed pictures when a panoramic photographing process is performed;
performing an image stitching process to determine overlapped regions of the two photographed pictures according to the flying altitude and the flying angle of the UAV, and obtain a feature operation region by way of division; and
performing a feature operation in the overlapped regions of the two photographed pictures to determine an image stitching location, and thus generate a panoramic picture, wherein the digital camera performs picture photographing at a first time to obtain a first photographed picture, and the digital camera performs picture photographing at a second time to obtain a second photographed picture, wherein the image stitching process comprises steps of:
obtaining a camera's focal length matrix according to focal lengths of the digital camera;
recording the flying altitude and the flying angle of the UAV at the first time, and further calculating a first rotation matrix according to a sensor fusion algorithm and the flying altitude and the flying angle recorded at the first time;

recording the flying altitude and the flying angle of the UAV at the second time, and further calculating a second rotation matrix according to the sensor fusion algorithm and the flying altitude and the flying angle recorded at the second time;

detecting a displacement of a center of a lens of the digital camera and obtaining a camera displacement matrix;

calculating a homograph matrix according to the camera's focal length matrix, the camera displacement matrix, the first rotation matrix and the second rotation matrix; and substituting image coordinates of the second photographed picture according to the homograph matrix to obtain corresponding image coordinates in the first photographed picture.

8. The panoramic photographing method according to claim 7, wherein the feature operation comprises:
a scale-invariant feature transform (SIFT) operation.

9. The panoramic photographing method according to claim 7, wherein the feature operation comprises:
a speeded up robust features (SURF) operation.

10. The panoramic photographing method according to claim 7, further comprising:
setting a first photographed picture functioning as a center picture of the panoramic picture.

11. The panoramic photographing method according to claim 7, wherein the UAV has an inertia measurement unit for detecting the flying altitude and the flying angle,
wherein the inertia measurement unit is a nine-axis sensor, comprising:
a triaxial magnetic field sensor;
a triaxial acceleration sensor; and
a triaxial gyroscope.

12. The panoramic photographing method according to claim 7, wherein the camera's focal length matrix comprises a first focal length matrix and a second focal length matrix, the digital camera photographs the first photographed picture through a first focal length, and the digital camera photographs the second photographed picture through a second focal length, where the first focal length is represented as $f_I$, the second focal length is represented as $f_J$, and the first focal length matrix is represented as $V_I$ having a mathematical equation of $$V_I = \begin{bmatrix} f_I & 0 & 0 \\ 0 & f_I & 0 \\ 0 & 0 & f_I \end{bmatrix},$$

where the second focal length matrix is represented as $V_J$ having a mathematical equation of $$V_J = \begin{bmatrix} f_J & 0 & 0 \\ 0 & f_J & 0 \\ 0 & 0 & f_J \end{bmatrix}.$$

13. The panoramic photographing method according to claim 12, wherein the camera displacement matrix is represented as $T_J$ having a mathematical equation of $$T_J = \begin{bmatrix} 1 & 0 & c_{jx} \\ 0 & 1 & c_{jy} \\ 0 & 0 & 1 \end{bmatrix}$$

where $C_{jx}$ represents a displacement amount of the center of the lens of the digital camera in an X-axis direction from the first time to the second time, $C_{jy}$ represents a displacement amount of the center of the lens of the digital camera in a Y-axis direction from the first time to the second time, the first rotation matrix is represented as $R_I$, the second rotation matrix is represented as $R_J$, and the homograph matrix is represented as H having a mathematical equation, which is represented as $H \approx V_I R_I R_J^{-1} (T_J V_J)^{-1}$.

* * * * *